US012611984B1

(12) United States Patent
Bieder

(10) Patent No.: US 12,611,984 B1
(45) Date of Patent: Apr. 28, 2026

(54) WINDOWPANE ASSEMBLY FOR A MOTOR VEHICLE

(71) Applicant: MERCEDES-BENZ GROUP AG, Stuttgart (DE)

(72) Inventor: Hubert Bieder, Denkendorf (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 57 days.

(21) Appl. No.: 18/869,421

(22) PCT Filed: Mar. 29, 2023

(86) PCT No.: PCT/EP2023/058090
§ 371 (c)(1),
(2) Date: Nov. 26, 2024

(87) PCT Pub. No.: WO2023/232312
PCT Pub. Date: Dec. 7, 2023

(30) Foreign Application Priority Data

May 30, 2022 (DE) ..................... 10 2022 001 884.5

(51) Int. Cl.
| | |
|---|---|
| *B60Q 3/208* | (2017.01) |
| *B60J 3/04* | (2006.01) |
| *F21V 3/04* | (2018.01) |
| *F21W 106/00* | (2018.01) |
| *F21W 107/10* | (2018.01) |

(52) U.S. Cl.
CPC ............... *B60Q 3/208* (2017.02); *B60J 3/04* (2013.01); *F21V 3/049* (2013.01); *F21W 2106/00* (2018.01); *F21W 2107/10* (2018.01)

(58) Field of Classification Search
CPC ................................ B60Q 3/208; F21V 3/049
See application file for complete search history.

(56) References Cited

U.S. PATENT DOCUMENTS

| | | | |
|---|---|---|---|
| 7,943,940 B2 | 5/2011 | Boonekamp et al. | |
| 10,901,131 B2 | 1/2021 | Schabacker et al. | |
| 2010/0237365 A1* | 9/2010 | Boonekamp | ......... G02B 6/0021 |
| | | | 257/E33.056 |

(Continued)

FOREIGN PATENT DOCUMENTS

| | | |
|---|---|---|
| DE | 102004007555 A1 | 9/2005 |
| DE | 102008045447 A1 | 3/2010 |

(Continued)

OTHER PUBLICATIONS

International Search Report and Written Opinion mailed Jul. 13, 2023 in related/corresponding International Application No. PCT/EP2023/058090.

(Continued)

*Primary Examiner* — Alexander K Garlen
(74) *Attorney, Agent, or Firm* — PATENT PORTFOLIO BUILDERS PLLC

(57) ABSTRACT

A motor vehicle windowpane assembly has a transparent base windowpane and at least one illuminant generating light during operation and emitting light in the direction of a base windowpane inner side. The assembly includes at least one reflection section arranged on the base windowpane inner side, which reflection section reflects the light from at least one of the at least one illuminants back.

10 Claims, 1 Drawing Sheet

(56)  References Cited

U.S. PATENT DOCUMENTS

| | | | |
|---|---|---|---|
| 2015/0283937 A1* | 10/2015 | Salter .................... | B60R 25/102 |
| | | | 362/510 |
| 2017/0327031 A1* | 11/2017 | Bauerle ............. | B32B 17/10036 |
| 2019/0193376 A1* | 6/2019 | Bauerle ............. | B32B 17/10293 |
| 2019/0255813 A1* | 8/2019 | Bauerle ...................... | B60J 1/20 |
| 2019/0263319 A1* | 8/2019 | Chen ........................ | B60Q 3/82 |
| 2020/0241189 A1* | 7/2020 | Schabacker ............ | G02B 6/001 |
| 2024/0151892 A1 | 5/2024 | Mooraj et al. | |

FOREIGN PATENT DOCUMENTS

| | | | | |
|---|---|---|---|---|
| DE | 102008045474 A1 | 3/2010 | | |
| DE | 102016108651 A1 * | 12/2016 | ............... | B60J 3/00 |
| DE | 102020101813 A1 | 7/2020 | | |
| EP | 2983909 B1 | 2/2016 | | |
| EP | 3925774 A1 * | 12/2021 | ....... | B32B 17/10788 |
| WO | 2008083915 A1 | 7/2008 | | |
| WO | 2022095959 A1 | 5/2022 | | |
| WO | WO-2022218741 A1 * | 10/2022 | ....... | B32B 17/10174 |

OTHER PUBLICATIONS

Office Action created Dec. 4, 2023 in related/corresponding DE Application No. 10 2022 001 884.5.

Office Action dated Jan. 19, 2026 in related/corresponding KR Application No. 10-2024-7038384.

* cited by examiner

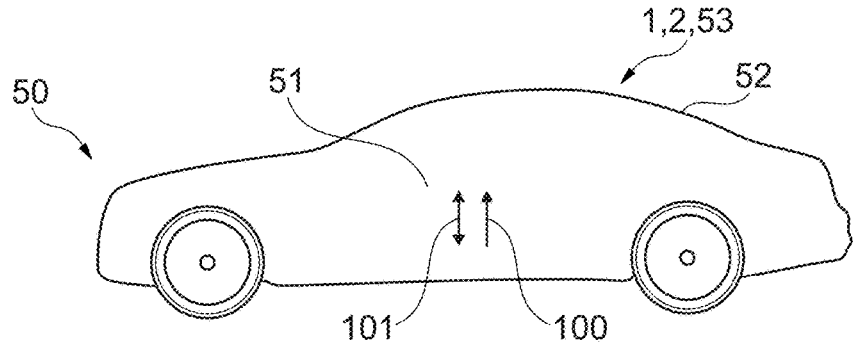
Fig. 1
Fig. 2
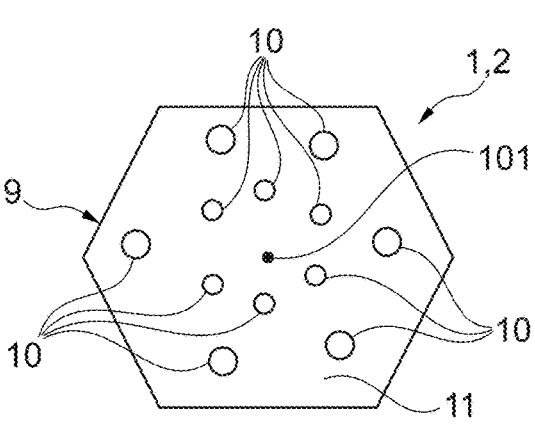
Fig. 3

WINDOWPANE ASSEMBLY FOR A MOTOR VEHICLE

BACKGROUND AND SUMMARY OF THE INVENTION

Exemplary embodiments of the present invention relate to a windowpane assembly, in particular a roof windowpane assembly, for a motor vehicle, as well as to a motor vehicle having such a windowpane assembly.

Motor vehicles normally have windowpanes through which the occupants of the motor vehicle can see outwards. These include, for example, the windscreen and side windowpanes. Such windowpanes can also be arranged in a roof of the motor vehicle in order to enable upward visibility and/or to allow light from outside to enter the motor vehicle.

In particular, the integration of windowpanes in the roof of the motor vehicle leads to a limitation of the lighting options.

A motor vehicle windowpane is known from DE 10 2008 045 447 A1 which has a first transparent layer and at least one luminous element arranged on the layer. A transparent conductor structure is also provided on the first layer for supplying energy to the luminous elements.

DE 10 2004 007 555 A1 describes an interior light for vehicles having a glass roof. The light has a lens and a light coupling element that couples light from an illuminant into the side of the lens. To ensure that light only comes from one side of the lens, the lens has a shading device.

Exemplary embodiments of the present invention are directed to improved or at least different embodiments for a windowpane assembly for a motor vehicle, as well as for a motor vehicle having such a windowpane assembly, which in particular eliminate disadvantages from the prior art. In particular, exemplary embodiments of the present invention are directed to the windowpane assembly and for the motor vehicle characterized by improved lighting.

Accordingly, the present invention is based on the general idea of providing a windowpane for a motor vehicle as an assembly in which illuminants emit light in the direction of a base windowpane, wherein local reflections are provided on the side of the base windowpane facing away from the illuminants, which reflect the light back to the illuminants such that the light emerges from the base windowpane outside the reflections and is thus emitted. This means that the illuminants in the assembly, which is also referred to below as the windowpane assembly, can be arranged as desired and in particular closer to predetermined output points of the light, such that the windowpane assembly can be used to emit light with increased light intensity across the entire windowpane assembly. The reflections also prevent the light from being emitted locally such that an individual output of the light, in particular light patterns, is implemented. The reflections can also be used to reduce the intensity of the emitted light locally, for example in order to avoid areas with increased light output, so-called "hotspots", which are usually located directly below the illuminants, or in order to at least reduce the light intensity in these areas. Overall, it is therefore possible to emit light with increased light intensity across the entire windowpane assembly, and at the same time adapt the light output to individual requirements. In particular, it is possible to reduce the light output in the area of a head and/or in the direction of eyes of occupants of the motor vehicle. As a result, the windowpane assembly leads to an individualized output of light and at the same time to increased comfort.

In accordance with the idea of the invention, the windowpane assembly has a transparent windowpane, which is the base windowpane. The base windowpane has two sides facing away from each other, which are also referred to below as the base windowpane inner side and the base windowpane outer side. The windowpane assembly also has an arrangement with at least one illuminant, which is hereinafter also referred to as the illuminant arrangement. The illuminant arrangement and thus the at least one illuminant is arranged on the side of the base windowpane outer side facing away from the base windowpane inner side. The respective illuminant is designed in such a way that it generates light in operation and emits it in the direction of the base windowpane inner side. The windowpane assembly also has a reflection arrangement.

The reflection arrangement is arranged on the base windowpane inner side and has at least one reflection section and at least one passage section. The respective reflection section is designed such that the reflection section reflects the light from at least one of the at least one illuminants, preferably the respective illuminant, back to the base windowpane outer side. The respective passage section is designed such that the passage section is transparent to the light from at least one of the at least one illuminants, preferably the respective illuminant, such that the light exits the windowpane assembly through the at least one passage section and is emitted.

Preferably, the reflection arrangement with the at least one reflection section is reflective and thus reflects the light of the at least one illuminant back and is otherwise transparent. As a result, light can pass over the reflection arrangement outside the at least one reflection section and thus be emitted.

In the present case, "transparent" is understood to mean permeable to the light from at least one of the at least one illuminants, preferably the respective illuminant.

Preferably, "transparent" is to be understood to mean permeable to visible light altogether. This means that light generated by the at least one illuminant can be emitted via the base windowpane inner side or the reflection arrangement and at the same time, light, in particular daylight, can pass through the windowpane assembly from the surroundings. In addition to the penetration of light from the outside through the windowpane assembly, this also in particular makes it possible to look through the windowpane assembly.

The windowpane assembly is advantageously used in a motor vehicle.

In the motor vehicle, the illuminant arrangement is preferably used to individually illuminate and/or light up an interior, in particular a passenger compartment.

Advantageously, the windowpane assembly defines the interior of the motor vehicle.

Advantageously, the base windowpane inner side or the reflection arrangement faces the interior of the motor vehicle.

It is conceivable that the windowpane assembly is used as a side windowpane of the motor vehicle and/or as a side window of the motor vehicle or a part thereof.

Advantageously, the windowpane assembly is used in a roof of the motor vehicle, i.e., is a roof windowpane assembly. In this way, the windowpane assembly generates individual and targeted light for occupants of the motor vehicle during operation of the illuminant arrangement. At the same time, occupants of the motor vehicle can look out through the roof windowpane assembly. The roof windowpane assembly thus preferably serves as a panoramic roof of the motor vehicle or is part of the panoramic roof. In particular, the roof windowpane assembly can be used to implement individual lighting in the form of a headliner and/or ambient lighting.

The illuminant arrangement of the windowpane assembly can have a single illuminant.

Advantageously, the illuminant arrangement has at least two illuminants. The illuminants are expediently spaced apart from one another. Advantageously, the illuminants are evenly distributed in the windowpane assembly and in particular in the illuminant arrangement. This allows light to be emitted evenly, individually and in a targeted manner.

The respective illuminant can be of any design, as long as it generates light during operation and emits it in the direction of the base windowpane inner side.

Advantageously, at least one of the at least one illuminants, preferably the respective illuminant, is a light-emitting diode or LED for short. This allows a compact design of the windowpane assembly, an increased number of illuminants and leads to reduced energy consumption.

If the illuminant arrangement has two or more illuminants, at least two of the illuminants can generate different types of light, for example different colors and/or light intensity.

Embodiments are preferred in which the illuminants generate the same type. Thus, a simple and cost-effective implementation of the windowpane assembly is achieved, wherein at the same time an individual output of the light as well as the avoidance of hotspots is implemented by means of the reflection arrangement, again in a simple and cost-effective manner.

The respective reflection section can be implemented in any desired manner, provided that it reflects back the light from at least one of the at least one illuminants, preferably the respective illuminant.

Advantageously, at least one of the at least one reflection sections, in particular the respective reflection section, is a reflective layer.

At least one of the at least one reflection sections, in particular the respective reflection section, can be applied directly onto the base windowpane inner side.

Embodiments are also conceivable in which the reflection arrangement has a film with at least one reflection section. The film is, furthermore, preferably transparent.

In advantageous embodiments, the reflection arrangement has at least two reflection sections and at least one passage section separating the reflection sections from one another along the base windowpane inner side. This enables a more individualized output of the light generated by the at least one illuminant.

Embodiments in which the windowpane assembly has sections that scatter the light reflected back from the at least one reflection section are considered advantageous, wherein these sections are also referred to below as scatter sections. Accordingly, embodiments in which a scatter structure with at least one scatter section is arranged on the side of the base windowpane outer side facing away from the base windowpane inner side are preferred.

The respective scatter section is designed such that the scatter section scatters the light reflected back from the reflection arrangement in the direction of the base windowpane inner side. The scattered light is thus emitted from the windowpane assembly as scattered or diffuse light via the at least one passage section. This leads to further individualization of the light output. In this way, it is also possible to define areas via which the light generated by the at least one illuminant passes directly and other areas via which the light generated by the at least one illuminant is emitted as scattered or diffuse light.

The windowpane assembly advantageously has a cover windowpane, wherein the illuminant arrangement is arranged between the cover windowpane and the base windowpane. This means that the windowpane assembly has the cover windowpane on the side of the illuminant arrangement facing away from the base windowpane outer side.

Advantageously, the illuminant arrangement is attached to the cover windowpane. This results in simple manufacture and a compact design of the windowpane assembly.

In advantageous embodiments, the illuminant arrangement has a functionalized film, also referred to below as a functional film. The functional film is advantageously electrically insulating and preferably made of plastic. The functional film is advantageously manufactured by means of injection molding. At least one of the at least one illuminants, preferably the respective illuminant, is attached to the functional film. Such functional films can easily be attached and/or processed between windowpanes and on a windowpane. The manufacture of the windowpane assembly is thus simplified and the windowpane assembly also becomes more compact.

The at least one illuminant can be attached to the functional film in any desired way. In particular, the at least one illuminant is joined to the functional film, for example glued.

Preferably, the functional film is attached to the cover windowpane, in particular glued to the side of the cover windowpane facing the base windowpane. This results in a simplified manufacture of the windowpane assembly.

Advantageously, the functional film has at least one electrically conductive path for electrically supplying the at least one illuminant. In preferred embodiments, the functional film is printed with the at least one conductive path. This results in a compact design and cost-effective manufacture of the windowpane assembly.

The use of such functional films is known, for example, from so-called "intelligent glasses" or "smart glasses", in particular in "polymer-dispersed liquid-crystal devices" or "PDLCs" for short, as well as from "suspended particle devices" or "SPDs" for short. As a result, the windowpane assembly can be manufactured in a simple, cost-effective and precise manner.

In advantageous embodiments, at least one of the at least scatter sections, in particular the scatter structure, is attached to the functional film. This leads to a further simplification of the manufacture of the windowpane assembly, and at the same time to a precise arrangement of the at least one scatter section and thus to a more precise light output.

In preferred embodiments, the reflection arrangement on the base windowpane inner side has such reflection sections in the light cone of at least one of the at least one illuminants, preferably the respective illuminant, and is free of reflection sections outside the light cone. An area of the of the reflection arrangement that is free of reflection sections is therefore arranged outside the light cone, which is referred to below as the passage area. This avoids said hotspots in a simple and effective manner, and at the same time achieves a targeted and/or extensive output of light.

The scatter structure is advantageously free of scatter sections in the area of at least one of the at least one illuminants and has scatter sections spaced apart from the illuminant. The scatter structure therefore has at least one area free of scatter sections, which is also referred to below

5 | 6 as the free area. The respective illuminant is expediently arranged in an associated free area.

Embodiments are considered preferred in which passage areas of the reflection arrangement that are free of reflection sections and free areas of the scatter structure that are free of scatter sections are spaced apart from one another transversely to the spacing direction of the base windowpane inner side to the base windowpane outer side. Preferably, at least one of the at least one passage areas overlaps transversely to the spacing direction with scatter sections. As a result, the direct emission of the light from the at least one of the at least one illuminants is prevented or at least reduced, such that hotspots are avoided or at least reduced. At the same time, the extensive and diffuse output of light is achieved outside the hotspots.

It is to be understood that, in addition to the windowpane assembly, a motor vehicle having such a windowpane assembly also belongs to the scope of this invention.

Further important features and advantages of the invention emerge from the sub-claims, from the drawings and from the associated description of the figures with reference to the drawings.

It is to be understood that the above-mentioned features and the features to be explained below can be used not only in the combination specified in each case, but also in other combinations or on their own, without departing from the scope of the present invention.

BRIEF DESCRIPTION OF THE DRAWING FIGURES

Preferred exemplary embodiments of the invention are represented in the drawings and are explained in more detail in the following description, wherein identical reference numerals refer to identical or similar or functionally identical components.

Here are shown, in each case schematically:

FIG. 1 a highly simplified section through a motor vehicle having a windowpane assembly, FIG. 2 a section through the windowpane assembly, FIG. 3 a plan view of a reflection arrangement of the windowpane assembly.

DETAILED DESCRIPTION

A windowpane assembly 1, represented by way of example in FIGS. 1 to 3, is used in a motor vehicle 50 represented by way of example in FIG. 1. In the exemplary embodiment shown, the windowpane assembly 1 is used on a roof 52 of the motor vehicle 50 and is thus a roof windowpane assembly 2, which is a component of a panoramic roof 53 of the motor vehicle 50 or forms the panoramic roof 53. The windowpane assembly 1 defines an interior 51 of the motor vehicle 50 for occupants (not shown). Consequently, the windowpane assembly 1 designed as a roof windowpane assembly 2 defines the interior 51 in a Z-direction 100 of the motor vehicle 50.

As can be seen from the section through the windowpane assembly 1 shown in FIG. 2, the windowpane assembly 1 has a transparent windowpane 3, which is also referred to below as a base windowpane 3. The base windowpane 3 has two sides 4, 5 facing away from each other, which are also referred to below as the base windowpane inner side 4 and the base windowpane outer side 5. The base windowpane inner side 4 and the base windowpane outer side 5 are spaced apart from each other in a direction 101, which is also referred to below as the spacing direction 101. In the exemplary embodiment shown, the spacing direction 101 run substantially parallel to the Z-direction 100.

The windowpane assembly 1 also has an arrangement 6 comprising at least one illuminant 7, which is also referred to below as the illuminant arrangement 6. In the exemplary embodiment shown, the illuminant arrangement 6 has at least two illuminants 7, wherein two such illuminants 7 can be seen in the sectional view in FIG. 2. In the exemplary embodiment shown, the respective illuminant 7 is formed as an LED 8. The illuminant arrangement 6 and thus the at least one illuminant 7 is arranged on the side of the base windowpane outer side 5 facing away from the base windowpane inner side 4. The respective illuminant 7 is designed, in particular aligned, in such a way that it generates light during operation and emits it in the direction of the base windowpane inner side 4. In the representation in FIG. 2, the light generated and emitted from the left illuminant 7 and its course or diffusion is indicated by arrows, by way of example.

The windowpane assembly 1 also has an arrangement 9, which is also referred to below as the reflection arrangement 9. The reflection arrangement 9 is arranged on the base windowpane inner side 4. The reflection arrangement 9 has at least one section 10 that reflects the light from at least one of the illuminants 9, in the exemplary embodiment shown and preferably from the respective illuminant 9, which is also referred to below as the reflection section 10. The respective reflection section 10 is designed in such a way that the reflection section 10 reflects the light of the illuminants 7 back to the base windowpane outer side 5, as indicated in FIG. 2 for one of the reflection sections 10. The reflection arrangement 9 also has at least one section 11 that is transparent to the light from at least one of the illuminants 9, in the present case and preferably for the visible light altogether, and which is also referred to below as the passage section 11. The respective passage section 11 is thus designed in such a way that the passage section 11 is transparent to the light of the illuminants 7, such that the light exits the windowpane assembly 1 via the passage sections 11 and is thus emitted. Thus, with a compact design, it is possible to emit light with any pattern and/or with an increased light intensity from the windowpane assembly 1 via the base windowpane inner side 4.

FIG. 3 shows a plan view of the reflection arrangement 9. As can be seen from FIG. 3, the reflection arrangement 9 in the exemplary embodiment shown has multiple reflection sections 10 spaced apart from one another and a contiguous passage section 11 separating the reflection sections 10 from one another along the base windowpane inner side 4. As can also be seen from FIG. 3, the reflection arrangement 9 in the exemplary embodiment shown has reflection sections 10 of different sizes. The respective reflection section 10 can be formed by a correspondingly reflective coating on the base windowpane inner side 4 or a film applied to the base windowpane inner side 4 (not shown in each case).

As indicated in FIG. 1, the windowpane assembly 1 with the base windowpane inner side 4 or the reflection arrangement 9 in the exemplary embodiment shown defines the interior 51 of the motor vehicle 50. With the windowpane assembly 1, it is thus possible, for example, to integrate a headliner in the panoramic roof 53.

In the exemplary embodiment shown, the illuminant arrangement 6 is arranged between the base windowpane 3 and a cover windowpane 18 of the windowpane assembly 1. The windowpane assembly 1 thus has the cover windowpane 18 on the side of the illuminant arrangement 6 facing away from base windowpane outer side 5.

In the exemplary embodiment shown, the illuminant arrangement 6 has, as can be seen in FIG. 2, a functional film 14 made of plastic, to which the illuminants 7 are attached. The functional film 16 and thus the illuminant arrangement 6 is attached to the cover windowpane 18. The illuminants 7, in particular the LEDs 8, can be glued to the functional film 14. In addition, conductive paths for the electrical supply of the illuminants 7, which are not shown, can be printed on the functional film 14.

In the exemplary embodiment shown, the windowpane assembly 1 has, as can be seen in FIG. 2, a structure 12, which scatters the light reflected back from the reflection arrangement 9 in the direction of the base windowpane inner side 4 by means of the sections 13, such that scattered or diffuse light is emitted via the at least one passage section 11. The structure 12 is also referred to below as the scatter structure 12 and the sections 13 as scatter sections 13. The respective scatter section 13 is designed in such a way that the scatter section 13 scatters the light reflected back from the reflection arrangement 9 in the direction of the base windowpane inner side 4, as is indicated by arrows in FIG. 2. In the exemplary embodiment shown, the scatter structure 12 is attached to the functional film 14.

As can also be seen from FIG. 2 in particular, in the exemplary embodiment shown, the reflection arrangement 9 has at least one area 16 which is free of reflection sections 10 and is therefore transparent to the light from the illuminants 7. This area 16 is also referred to below as passage areas 16. In the passage areas 16, the light can therefore pass out of the windowpane assembly 1 via the base windowpane inner side 4. In the exemplary embodiment shown, the reflection arrangement 9 has such reflection sections 10 on the base windowpane inner side in the light cone 15 of the respective illuminant 9 and is free of reflection sections 10 outside the light cone 15. Therefore, areas outside the light cone 15 are passage areas 16. As a result, the light generated by the respective illuminant 7 cannot pass completely directly out of the windowpane assembly 1, such that so-called hotspots of light are avoided.

As can also be seen in FIG. 2, in the exemplary embodiment shown, the scatter sections 13 are arranged in groups, such that the scatter structure 12 has areas 17 free of scatter sections 13, which are also referred to below as free areas 17. The light is therefore not scattered in the free areas 17. The illuminants 7 are each arranged in such a free area 17, the scatter structure 12 is thus free of scatter sections 13 in the area of the illuminants 9. In addition, in the exemplary embodiment shown, passage sections 16 of the reflection arrangement 9 and free areas 17 of the scatter structure 12 are spaced apart from one another transversely to the spacing direction 101 of the base windowpane inner side 4 to the base windowpane outer side 5, such that at least one passage area 16 overlaps with the grouped scatter sections 13. Thus, as indicated by the arrows in FIG. 2, the light reflected back from the reflection sections 10 of the reflection arrangement 9 is scattered by the scatter sections 13 in the direction of the passage area 16.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A motor vehicle windowpane assembly comprising:
   a transparent base windowpane having a base windowpane inner side and a base windowpane outer side facing away from the base windowpane inner side;
   an illuminant arrangement arranged on a side of the base windowpane outer side facing away from the base windowpane inner side and having at least one illuminant, wherein the at least one illuminant is configured to generate light during operation and emit the generated light in a direction of the base windowpane inner side; and
   a reflection arrangement arranged on the base windowpane inner side,
   wherein the reflection arrangement has at least one reflection section and at least one passage section,
   wherein the at least one reflection section is configured to reflect the light emitted by at least one of the at least one illuminants back to the base windowpane outer side, and
   wherein the at least one passage section is transparent to the light emitted from the at least one of the at least one illuminants such that the light emitted from the at least one of the at least one illuminants exits the windowpane assembly.

2. The windowpane assembly of claim 1, wherein the reflection arrangement has at least two reflection sections and at least one passage section separating the at least two reflection sections from one another along the base windowpane inner side.

3. The windowpane assembly of claim 1, further comprising:
   a scatter structure, having at least one scatter section, arranged on the side of the base windowpane outer side facing away from the base windowpane inner side, wherein the at least one scatter section is configured to scatter the light reflected back from the reflection arrangement in the direction of the base windowpane inner side.

4. The windowpane assembly of claim 3, wherein the illuminant arrangement has a functional film to which the at least one illuminant is attached.

5. The windowpane assembly of claim 4, wherein the scatter structure is attached to the functional film.

6. The windowpane assembly of claim 1, wherein the reflection arrangement has the at least one reflection section on the base windowpane inner side in a light cone of the at least one of the at least one illuminants and the reflection arrangement is free of reflection sections outside the light cone of the at least one of the at least one illuminants.

7. The windowpane assembly of claim 5, wherein the scatter structure is free of scatter sections in an area of the at least one of the at least one illuminants and has scatter sections spaced apart from the at least one of the at least one illuminants.

8. The windowpane assembly of claim 7, wherein passage areas of the reflection arrangement that are free of reflection sections, and free areas of the scatter structure that are free of scatter sections are spaced apart from one another transversely to a spacing direction of the base windowpane inner side to the base windowpane outer side.

9. The windowpane assembly of claim 4, further comprising:

a cover windowpane on a side of the illuminant arrangement facing away from the base windowpane outer side, wherein the functional film is attached to the cover windowpane.

10. A motor vehicle comprising:

a windowpane assembly comprising a transparent base windowpane having a base windowpane inner side and a base windowpane outer side facing away from the base windowpane inner side;

an illuminant arrangement arranged on a side of the base windowpane outer side facing away from the base windowpane inner side and having at least one illuminant, wherein the at least one illuminant is configured to generate light during operation and emit the generated light in a direction of the base windowpane inner side; and a reflection arrangement arranged on the base windowpane inner side, wherein the reflection arrangement has at least one reflection section and at least one passage section, wherein the at least one reflection section is configured to reflect the light emitted by at least one of the at least one illuminants back to the base windowpane outer side, and wherein the at least one passage section is transparent to the light emitted from the at least one of the at least one illuminants such that the light emitted from the at least one of the at least one illuminants exits the windowpane assembly, wherein the windowpane assembly defines an interior of the motor vehicle.

* * * * *